United States Patent
O'Banion

(10) Patent No.: US 6,390,739 B1
(45) Date of Patent: May 21, 2002

(54) POWER DRIVABLE CHUCK

(75) Inventor: Michael L. O'Banion, Westminster, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/621,083

(22) Filed: Jul. 21, 2000

Related U.S. Application Data

(60) Provisional application No. 60/144,827, filed on Jul. 21, 1999.

(51) Int. Cl.⁷ .................. B23B 31/103; B23B 51/00
(52) U.S. Cl. .................. 408/239 R; 279/24; 279/78; 279/89; 279/904; 408/226
(58) Field of Search .................. 279/24, 29, 30, 279/76–80, 89, 90, 95, 97, 904, 906; 408/226, 239 R; 285/308, 317, 320; 403/325, 327, 330

(56) References Cited

U.S. PATENT DOCUMENTS

| | | | | |
|---|---|---|---|---|
| 1,034,723 A | * | 8/1912 | Mueller et al. | 279/97 |
| 1,138,465 A | | 5/1915 | Fegley et al. | |
| 1,311,961 A | * | 8/1919 | Gairing | 279/22 |
| 1,413,101 A | * | 4/1922 | Cushing | 279/89 |
| 2,387,339 A | * | 10/1945 | Meyer | 408/226 |
| 2,393,424 A | * | 1/1946 | Selch | 408/226 |
| 5,316,323 A | * | 5/1994 | Jovanovic | 279/905 |
| 5,340,245 A | | 8/1994 | Bloechle et al. | |
| 5,398,946 A | | 3/1995 | Quiring | |
| 5,785,448 A | * | 7/1998 | Courgeon | 403/325 |
| 6,053,675 A | * | 4/2000 | Holland et al. | 408/239 R |
| 6,261,035 B1 | * | 7/2001 | Moores, Jr. et al. | 408/239 R |

* cited by examiner

Primary Examiner—Steven C. Bishop
(74) Attorney, Agent, or Firm—Charles E. Yocum

(57) ABSTRACT

A body 52 of a chuck 30 has an axial opening 34 and is formed with three spaced radial slots 58 which receive three respective locking fingers 68 extending radially inward from a circular band 66. The band 66 is located outside of, and rotatable relative to, the body 52. The band 66 and the locking fingers 68 form a latching unit 64 which is confined to a transaxial plane 61. A spring 70 is attached the latching unit 64 and to the body 52 and normally urges each of the locking fingers 68 against one end of the respective slots 58. A plurality of spaced ribs 54 extend radially inward from an inner wall of the opening 34. A bit 36 is formed with a shank 38 having a plurality of axial grooves 42 which extend through a free end of the shank. A wall of each groove 42 is formed with a transaxial groove 50 at a prescribed distance from the free end of the shank 38. Slanted surfaces 44 on the free end of the shank 38, being inserted into the opening 34, engage and cam the respective locking fingers 68 into alignment with the axial grooves 42, which allows the shank to inserted further. The locking fingers 68 are prevented from returning to their original position until the fingers are aligned with, and biased into, the transaxial grooves 50 to lock the shank with the chuck 30.

20 Claims, 4 Drawing Sheets

POWER DRIVABLE CHUCK

This application claims priority from provisional application Ser. No. 60/144,827, filed Jul. 21, 1999.

BACKGROUND OF THE INVENTION

This invention relates to a power drivable chuck, and particularly relates to a power drivable chuck having a shank-responsive locking element, and to an accessory having a shank configuration which facilitates assembly of the shank with the chuck.

Typically, chucks are designed with an opening for receiving a shank of an accessory, such as a bit, and locking the shank with the chuck. In a keyed chuck, the shank is inserted into an opening of a body of the chuck and a key is used to advance jaws within the body, in axial and radially inward directions to clamp about the inserted shank. In a keyless chuck, a mechanism is contained within the opening of the body, which is responsive to the insertion of the shank therein, for operating a locking mechanism also contained within the body.

In many instances, the locking mechanism includes a rolling element, such as a ball or a roll, which is moved aside from a biased locking position by the incoming shank, and returns to the locking position when an accommodating portion of the shank is aligned with the rolling element. While locking mechanisms with a rolling element perform very satisfactorily in many instances, there is a need for more firm locking mechanism for heavy duty tasks.

Also, there is a need for a shank-locking mechanism for chucks which is economical to manufacture, and easy to operate.

Further, there is a need for an accessory, such as a bit, formed with a shank which facilitates the operation of the shank-locking features of a chuck.

SUMMARY OF THE INVENTION

It is therefore, an object of this invention to provide a chuck having firm locking mechanism for heavy duty tasks.

It is also an object of this invention to provide a chuck having a shank-locking mechanism which is economical to manufacture, and easy to operate.

Further, it is an object of this invention to provide an accessory with a shank which facilitates the operation of shank-locking features of a chuck.

With these and other objects in mind, this invention contemplates a power drivable chuck for receiving and clamping a shank having at least one axial groove formed in the periphery thereof extending to a free end of the shank, and having a transaxial groove formed in a side wall, along an intermediate portion, of the axial groove. The chuck includes a body having an opening therein for receipt of the shank. The opening of the body is formed with a wall, and at least one axial rib formed on and extending inward from the wall of the opening of the body for receipt of the axial groove of the shank. A locking element is located within the opening of the body. Means, responsive to the insertion of the free end of the shank into the opening of the body, are provided for facilitating the directing of the locking element into the axial groove of the body to allow the shank to be moved further into the opening. Other means, responsive to an alignment of the locking element with the transaxial groove, are provided for directing the locking element into the transaxial groove to lock the shank with the chuck.

This invention further contemplates a power drivable chuck for receiving and clamping a shank having at least one axial groove formed in the periphery thereof extending to a free end of the shank, and having a transaxial groove formed in a side wall, along an intermediate portion, of the axial groove. The chuck includes a body having an axis and an axial opening formed therein for receipt of the shank. The opening of the body is formed with a wall, with at least one axial rib formed on and extending inward from the wall of the opening of the body for receipt of the axial groove of the shank. A slot is formed in the body and has a first end surface at first end thereof and a second end surface at a second end thereof spaced from the first end. A locking element is located within the opening of the body and has a portion thereof located within the slot for movement relative thereto within a plane between the first end surface and the second surface of the slot. A biasing element is provided for normally urging the locking element into engagement with the first end surface and allowing movement of the locking element toward the second end surface upon the application of a force sufficient to overcome an urging force as applied by the biasing element.

Additionally, this invention contemplates an accessory with a shank having an axis and a free end. An axial groove is formed in the shank through the free end thereof, and the axial groove is formed with a wall. A transaxial groove is formed in the wall of the axial groove at a location spaced inboard from the free end of the shank.

Other objects, features and advantages of the present invention will become more fully apparent from the following detailed description of the preferred embodiment, the appended claims and the accompanying drawings.

DETAILED DESCRIPTION OF THE PREFERRED EMBODIMENTS

Figure 1:
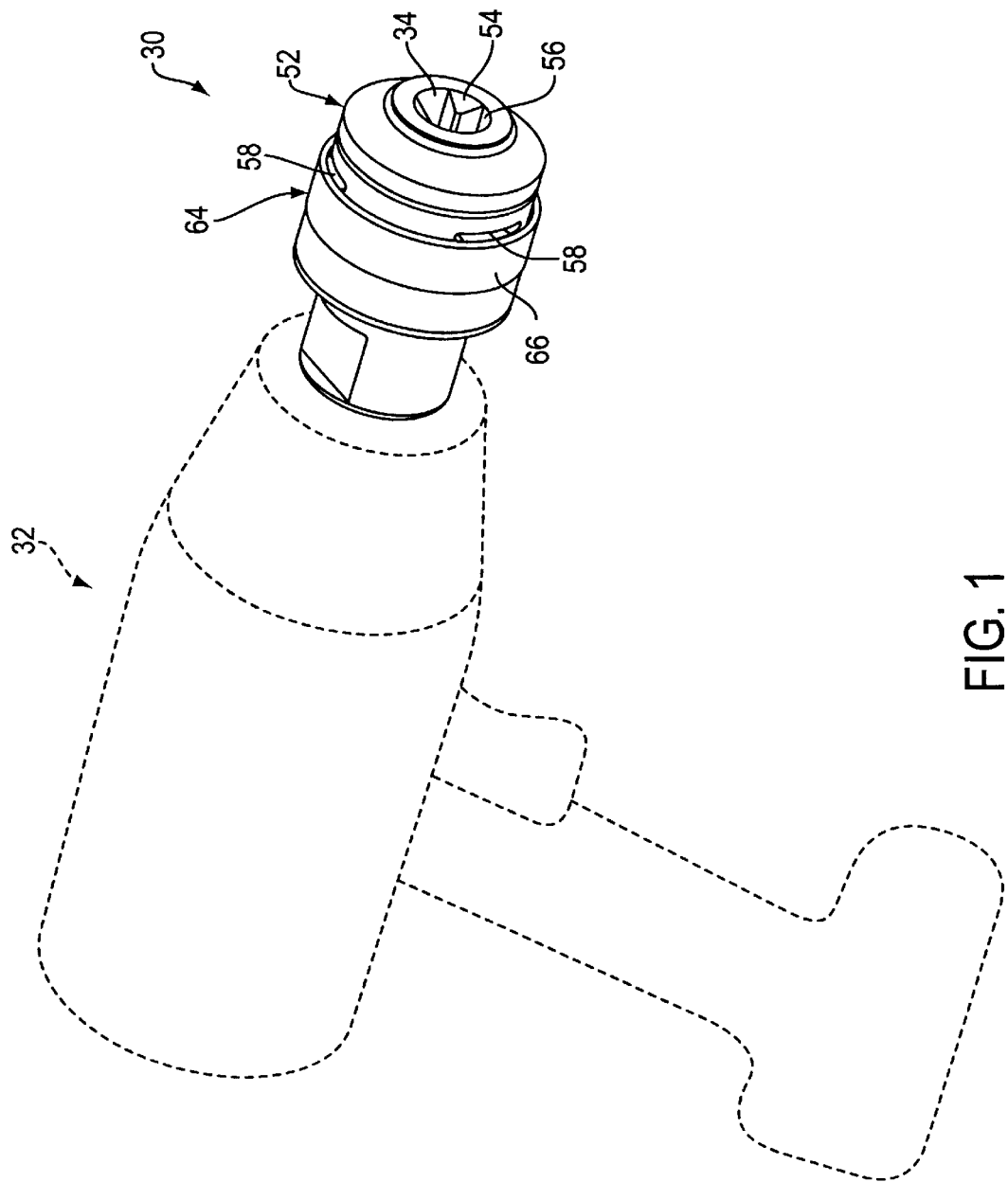
FIG. 1 is a perspective view showing a chuck in accordance with certain principles of the invention.
Figure 2:
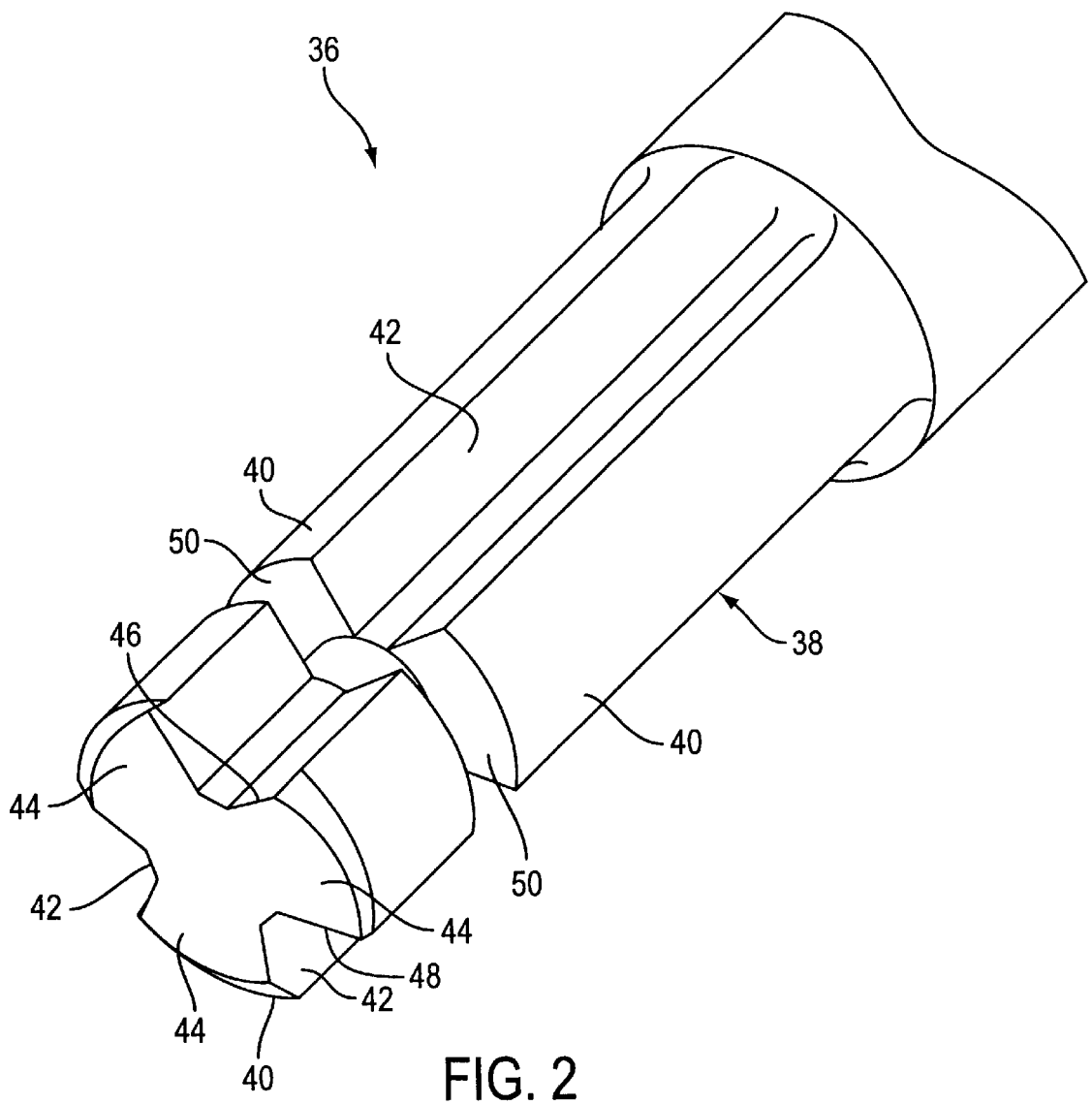
FIG. 2 is a perspective view of an accessory formed with a shank in accordance with certain principles of the invention.

Referring to FIG. 1, a chuck 30 can be coupled to a power driver such as, for example, a drill 32, shown in phantom, for rotating the chuck. The chuck 30 is designed with a shank-receiving opening 34 for receiving and locking a bit 36, as shown in FIG. 2, having a shank 38 with a plurality of spaced, axially-aligned ribs 40, separated by a plurality of axially-aligned grooves 42. A free, or rear, end of each of the ribs 40 is formed with a slanting surface 44 (FIG. 6), which slants forwardly from a first side edge 46 to a second edge 48 of the rear end of the rib. Each of the ribs 40 is formed with a transaxial groove 50, where all of the grooves are located in a common plane perpendicular to the axis of the bit 36.

A plurality of bits, having ribs and grooves formed in the shanks, are disclosed in a now abandoned patent application identified by U.S. Ser. No. 60/108,336, filed on Nov. 13, 1998, and its successor pending nonprovisional patent application identified by U.S. Ser. No. 09/439,505, filed on Nov. 12, 1999, the disclosures of which are incorporated herein by reference thereto. The ribs of the bits disclosed in the above-noted pending patent application may be modified by the formation of a groove, such as the groove 50, to facilitate insertion and locking of the modified bits in the chuck 30.

Figure 4:
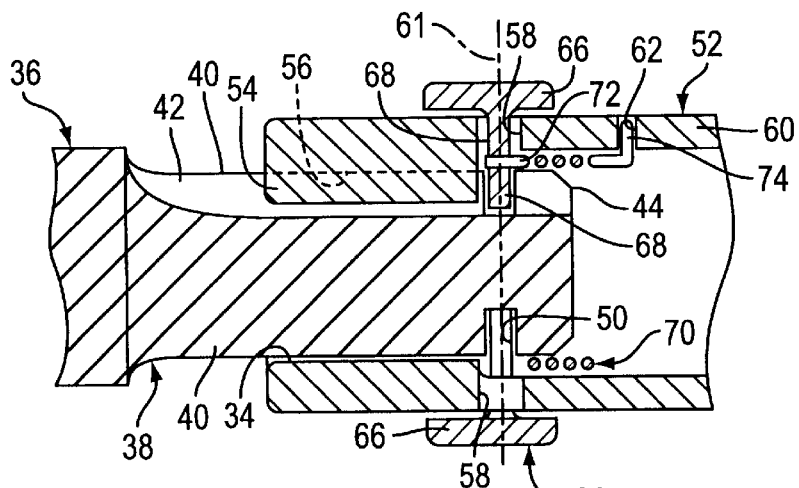
FIG. 4 is a side sectional view showing the locking mechanism of FIG. 3 in the locked mode in accordance with certain principles of the invention.

Referring to FIGS. 1 and 4, the chuck 30 includes a chuck body 52 formed with a plurality of spaced ribs 54, which extend radially inward from an inner wall of the shank-receiving opening 34, with grooves 56 between the ribs. The chuck disclosed in the above-identified pending patent application is formed with ribs and grooves in a similar arrangement.

Referring to FIG. 4, the chuck body 52 includes three slots 58, each of which is formed radially through a cylindrical wall 60 of the body adjacent an inboard end of the respective ribs 54 of the body and in a common plane 61 perpendicular to the axis of the body. A small hole 62 is formed through the wall 60 of the body at a location to the rear of the plane 61 of the slots 58.

Figure 3:
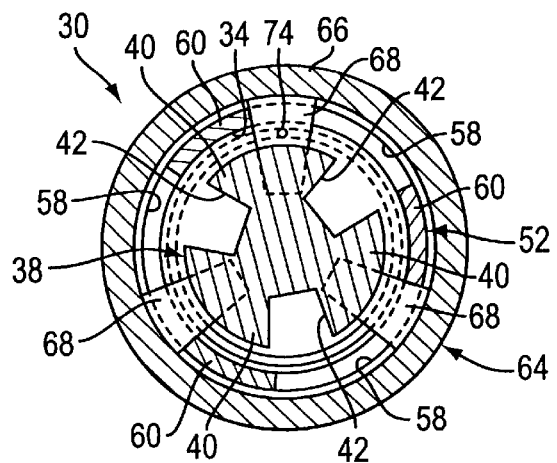
FIG. 3 is a sectional view showing a locking mechanism of the chuck of FIG. 1 in a locked mode in accordance with certain principles of the invention.
Figure 5:
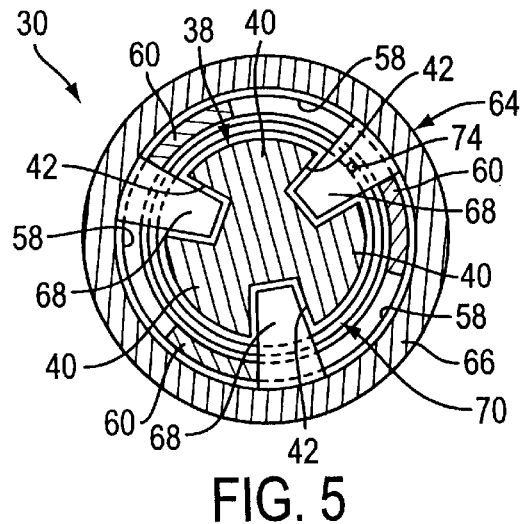
FIG. 5 is a sectional view showing the locking mechanism of FIG. 3 in a transition mode in accordance with certain principles of the invention.

A latching unit 64 is formed with a movable external element, such as a circular band 66, which is located about the chuck body 52 radially outward of the slots 58, and is further formed with a plurality of locking elements, such as three spaced locking fingers 68, extending radially inward from an inside wall of the band. Each of the locking fingers 68 is located within a respective one of the slots 58, as shown in FIGS. 3, 4 and 5, and is movable angularly in the plane 61 between opposite ends of the respective slot. Referring to FIG. 4, a coil spring 70 is located within the opening 34 of the chuck body 52, just rearward of the plane 61. The spring 70 is formed with a straight forward end 72, which is located in a small hole in an intermediate portion of one of the locking fingers 68, and a straight rearward end 74, which is located in the opening 62 of the chuck body 52.

Figure 6:
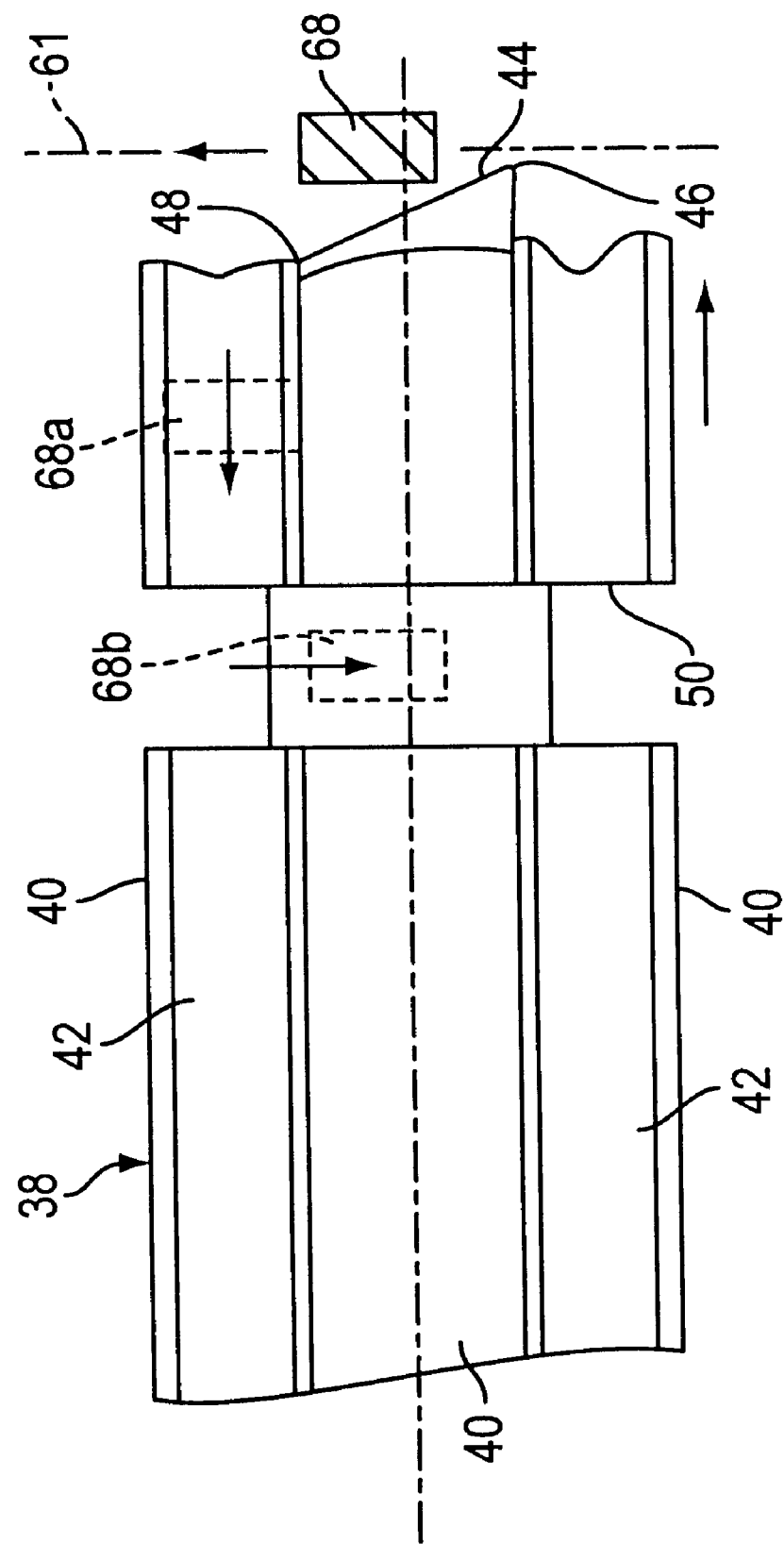
FIG. 6 is a diagrammatical view showing a locking element of the locking mechanism of FIG. 3 in transition between two positions at which the locking element is in a locked position in accordance with certain principles of the invention.

As represented in the illustration of FIG. 3, an operator has inserted the rear portion of the shank 38 into the opening 34 of the chuck body 52, which is guided by the ribs 54 (not shown in FIG. 3), as described in the above-noted pending patent application, to a position slightly forward of the plane 61, as represented in FIG. 6. Referring again to FIG. 3, in this position, each of the locking fingers 68 is at one end of the respective one of the slots 58, which precludes movement of the band 66 and the fingers in a counterclockwise direction. Also, each of the locking fingers 68 is aligned with, and to the rear of, the slanted surface 44 of a respective one of the ribs 40 of the shank 38.

As the shank 38 is moved further into the chuck opening 34, the slanted surface 44 of each rib 40 engages the respective finger 68 and moves the finger, and the band 66, in a rotary direction within the plane 61, whereby the spring 70 is being wound in a tensioning direction. Eventually, the fingers 68 are moved angularly in the plane 61 to a position of alignment with a respective one of the grooves 42 of the shank 38, as shown in FIG. 5.

Upon continued insertion movement of the shank 38, the grooves 42 of the shank 38 allow the continued rearward movement of the shank by providing a clear path for the shank past the respective locking fingers 68, which remain in the plane 61. However, the side walls of the grooves 42 restrain the fingers from moving angularly within the plane 61, whereby the spring 70 remains in the tensioned condition. For illustration purposes only, the relative axial movement of the grooves 42 of the shank 38 and the fingers 68 is represented in FIG. 6 by the dashed line finger 68a, it being understood that the finger 68a has remained in the plane 61.

As the shank 38 is moved further rearward, the transaxial groove 50 of the shank is eventually aligned with the plane 61, where the locking fingers 68 are now free of the restraints of the grooves 42 thereon. At this time, the tensioned spring 70 relaxes to move the locking fingers 68 in a clockwise direction to the limit of the opposite ends of the respective slots 58. Under the released energy of the relaxed spring 70, the fingers 68 are moved into respective ones of the transaxial grooves 50 of the shank 38. For illustration purposes only, this movement of the fingers 68 is represented by the dashed line finger 68b in FIG. 6, it being understood that the finger 68b has remained in the plane 61.

The bit 36 is now locked with the chuck 30, whereby axial movement of the bit relative to the chuck body 52 is precluded as long as the locking fingers 68 remain in the transaxial groove 50.

When the operator desires to remove the bit 36 from the chuck 30, the operator turns the band 66 by hand to move the locking fingers 68 out of the transaxial groove 50 and into alignment with the grooves 42 of the shank 38. The bit 36 can now be withdrawn from the chuck 30.

The axial width of the transaxial groove 50 of the shank 38 can be slightly wider than the width of the locking fingers 68 to provide a firm lock for use of the bit 36, for example, in a rotary drilling operation. Also, the transaxial groove 50 of the shank 38 can be somewhat wider than the width of the locking fingers 68 to allow some axial movement of the bit 36, for example, in a hammering or hammer drilling operation.

In general, the above-identified embodiments are not to be construed as limiting the breadth of the present invention. Modifications, and other alternative constructions, will be apparent which are within the spirit and scope of the invention as defined in the appended claims.

What is claimed is:

1. A power drivable chuck for receiving and clamping a shank having at least one axial groove formed in the periphery thereof extending to a free end of the shank, and having a transaxial groove formed in a side wall, along an intermediate portion, of the axial groove, which comprises:

a body having an opening therein for receipt of the shank;

the opening of the body formed with a wall;

at least one axial rib formed on and extending inward from the wall of the opening of the body for receipt of the axial groove of the shank;

a locking element located within the opening of the body;

means, responsive to the insertion of the free end of the shank into the opening of the body, for facilitating the directing of the locking element into the axial groove of the body to allow the shank to be moved further into the opening; and means, responsive to an alignment of the locking element with the transaxial groove, for directing the locking element into the transaxial groove to lock the shank with the chuck.

2. The power drivable chuck as set forth in claim 1, which further comprises:

the opening and the rib each being of a prescribed size and configuration for receipt and support of the chuck-mountable shank of any one of a plurality of the shanks having different external transaxial dimensions.

3. The power drivable chuck as set forth in claim 1, which further comprises:

the locking element being normally circumferentially offset from the axial rib of the body.

4. The power drivable chuck as set forth in claim 1, which further comprises:

the locking element being confined for angular movement only within a plane perpendicular to an axis of the opening of the body.

5. The power drivable chuck as set forth in claim 1, which further comprises:

a stop surface formed on the body;

the locking element being biasingly and normally urged into engagement with the stop surface to locate the locking element for initiation of movement of the locking element upon insertion of the shank into the opening of the body.

6. The power drivable chuck as set forth in claim 1, wherein the means for facilitating comprises:

the locking element formed with a surface located for engagement with the free end of the shank upon insertion thereof into the opening of the body;

the locking element being mounted within the body for rotary movement; and a biasing member in engagement with the locking member for continuously urging the locking member in a prescribed direction.

7. The power drivable chuck as set forth in claim 1, wherein the means for directing comprises:

the locking element being mounted within the body for rotary movement; and a biasing member in engagement with the locking element for normally urging the locking member in a prescribed direction.

8. The power drivable chuck as set forth in claim 1, which further comprises:

a slot formed through the body;

a movable external element located outside the body adjacent the slot formed therethrough;

the locking element being formed on the movable external element and extending inward therefrom and through the slot formed in the body.

9. The power drivable chuck as set forth in claim 1, which further comprises:

a slot formed through the body;

the locking element being located within the slot for movement relative thereto;

the slot formed with a radial length sufficient to allow the locking element to be moved between a locked position and an unlocked position.

10. A power drivable chuck for receiving and clamping a shank having at least one axial groove formed in the periphery thereof extending to a free end of the shank, and having a transaxial groove formed in a side wall, along an intermediate portion, of the axial groove, which comprises:

a body having an axis and an axial opening formed therein for receipt of the shank;

the opening of the body formed with a wall;

at least one axial rib formed on and extending inward from the wall of the opening of the body for receipt of the axial groove of the shank;

a slot formed in the body and having a first end surface at first end thereof and a second end surface at a second end thereof spaced from the first end;

a locking element located within the opening of the body and having a portion thereof located within the slot for movement relative thereto within a plane between the first end surface and the second surface of the slot; and a biasing element for normally urging the locking element into engagement with the first end surface and allowing movement of the locking element toward the second end surface upon the application of a force sufficient to overcome an urging force as applied by the biasing element.

11. The power drivable chuck as set forth in claim 10, which further comprises:

the opening and the rib each being of a prescribed size and configuration for receipt and support of the chuck-mountable shank of any one of a plurality of the shanks having different external transaxial dimensions.

12. The power drivable chuck as set forth in claim 10, which further comprises:

the locking element being normally circumferentially offset from the axial rib of the body.

13. The power drivable chuck as set forth in claim 10, which further comprises:

the locking element being confined for angular movement only within a plane perpendicular to an axis of the opening of the body.

14. The power drivable chuck as set forth in claim 10, which further comprises:

the slot being formed through the body;

a movable external element located outside the body adjacent the slot; and the locking element being formed on the movable external element and extending inward therefrom and through the slot, whereby the locking element is movable within the slot upon movement of the movable external element.

15. The power drivable chuck as set forth in claim 10, which further comprises:

the locking element is formed with a surface which is normally positioned to engage and be responsive to the free end of the shank being inserted into the opening of the body to cam the locking element a first position to a second position.

16. The power drivable chuck as set forth in claim 10, which further comprises:

the slot is a first slot formed through the body in the plane which is a transaxial plane;

at least a second slot formed in the body in the transaxial plane and spaced from the first slot;

the locking element is a first locking element;

at least a second locking member located within the opening of the body and having a portion thereof located within the at least second slot for movement relative thereto within the transaxial plane between the first end surface and the second surface of the slot;

the biasing element normally urging the first locking element and the at least second locking element into engagement with the respective first end surfaces and allowing movement of the locking elements toward the respective second end surfaces upon the application of a force sufficient to overcome an urging force as applied by the biasing element.

17. The power drivable chuck as set forth in claim 16, which further comprises:

a circular band located outside of the body within the transaxial plane and movable relative to the body;

the locking elements being formed on the circular band at spaced locations thereof and extending inward therefrom and through the respective slots, whereby the locking elements are movable within the respective slots upon movement of the circular band.

18. An accessory, which comprises:

a shank having an axis and a free end;

an axial groove formed in the shank through the free end thereof which is a first end of the groove;

the axial groove formed with a wall which extends from the first end to a second end thereof inboard of, and spaced from, the first end; and a transaxial groove formed in the wall of the axial groove at a location between, and spaced from, the first end and the second end of the axial groove.

19. The accessory as set forth in claim 18, which further comprises:

the free end of the shank formed with a slanting surface which slants from a first edge to a second edge of the free end.

20. An accessory, which comprises:

a shank having a free end; and the free end of the shank formed with at least one slanting surface which slants from a first edge at a first side of the shank to a second edge at a second side of the shank located generally opposite the first side of the shank.

* * * * *